US011172530B2

(12) United States Patent
Li et al.

(10) Patent No.: US 11,172,530 B2
(45) Date of Patent: Nov. 9, 2021

(54) COMMUNICATION ESTABLISHMENT METHOD AND TERMINAL

(71) Applicant: HUAWEI TECHNOLOGIES CO., LTD., Guangdong (CN)

(72) Inventors: Jiaxin Li, Shanghai (CN); Jian Chen, Shanghai (CN); Jun Yang, Shenzhen (CN); Jing Qian, Qian (CN); Yaoying Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/474,817

(22) PCT Filed: Feb. 25, 2017

(86) PCT No.: PCT/CN2017/074897
§ 371 (c)(1),
(2) Date: Jun. 28, 2019

(87) PCT Pub. No.: WO2018/120390
PCT Pub. Date: Jul. 5, 2018

(65) Prior Publication Data
US 2019/0342933 A1 Nov. 7, 2019

(30) Foreign Application Priority Data

Dec. 28, 2016 (CN) .......................... 201611239419.8

(51) Int. Cl.
*H04W 76/15* (2018.01)
*H04W 4/06* (2009.01)
(Continued)

(52) U.S. Cl.
CPC ............. *H04W 76/15* (2018.02); *H04W 4/06* (2013.01); *H04W 8/22* (2013.01); *H04W 88/06* (2013.01)

(58) Field of Classification Search
CPC ....... H04W 76/15; H04W 88/06; H04W 8/22; H04W 4/06; H04W 4/006
See application file for complete search history.

(56) References Cited

U.S. PATENT DOCUMENTS 10,506,035 B2 * 12/2019 Kim ..................... H04W 12/003
10,548,068 B2 *  1/2020 Lee ....................... H04W 36/03
(Continued)

FOREIGN PATENT DOCUMENTS

CN    101933310 A    12/2010
CN    103078900 A     5/2013
(Continued)

OTHER PUBLICATIONS

Office Action issued in Chinese Application No. 201780081664.7 dated Jan. 7, 2020, 21 pages (With English Translation).
(Continued)

*Primary Examiner* — Kibrom T Hailu
(74) *Attorney, Agent, or Firm* — Fish & Richardson P.C.

(57) ABSTRACT

Embodiments of the present invention provide a communication establishment method. The method includes: receiving, by a first terminal, a first broadcast message of a first wireless communications mode sent by a second terminal, where the first broadcast message carries a second wireless communications mode supported by the second terminal and a status and/or supported protocol information of the second wireless communications mode; and determining, by the first terminal based on the second wireless communications mode supported by the second terminal and the status and/or the supported protocol information of the second wireless communications mode, whether to connect to the second terminal.

16 Claims, 12 Drawing Sheets

(51) Int. Cl.
*H04W 8/22* (2009.01)
*H04W 88/06* (2009.01)

(56) References Cited

U.S. PATENT DOCUMENTS

| | | | |
|---|---|---|---|
| 2009/0092075 A1* | 4/2009 | Corson | H04W 8/005 370/328 |
| 2011/0013564 A1 | 1/2011 | Zou et al. | |
| 2012/0072340 A1 | 3/2012 | Amron | |
| 2012/0196534 A1 | 8/2012 | Kasslin et al. | |
| 2014/0323048 A1 | 10/2014 | Kang | |
| 2014/0342670 A1* | 11/2014 | Kang | H04M 1/7253 455/41.2 |
| 2014/0342671 A1* | 11/2014 | Kim | H04W 4/80 455/41.3 |
| 2014/0373123 A1* | 12/2014 | Kang | G06F 21/10 726/7 |
| 2015/0017977 A1* | 1/2015 | Ratasuk | H04W 48/12 455/426.1 |
| 2015/0026580 A1* | 1/2015 | Kang | H04W 12/04 715/728 |
| 2015/0289315 A1* | 10/2015 | Ratasuk | H04L 12/18 370/312 |
| 2015/0358805 A1* | 12/2015 | Sinha | H04W 8/005 455/434 |
| 2016/0150358 A1* | 5/2016 | Ko | H04W 4/80 455/41.1 |
| 2016/0345376 A1* | 11/2016 | Yang | H04W 48/10 |
| 2017/0094587 A1 | 3/2017 | Ding et al. | |
| 2017/0094696 A1* | 3/2017 | Truong | H04W 48/18 |
| 2017/0223615 A1 | 8/2017 | Lee et al. | |
| 2018/0205788 A1* | 7/2018 | Kim | H04L 12/281 |

FOREIGN PATENT DOCUMENTS

| | | |
|---|---|---|
| CN | 104540090 A | 4/2015 |
| CN | 105144757 A | 12/2015 |
| CN | 105471478 A | 4/2016 |
| CN | 105830503 A | 8/2016 |
| EP | 2997669 B1 | 3/2020 |
| WO | 2014173186 A1 | 10/2014 |
| WO | 2016017909 A1 | 2/2016 |

OTHER PUBLICATIONS

Extended European Search Report issued in European Application 17888339.3 dated Aug. 20, 2019, 10 pages.
PCT International Search Report and Written Opinion issued in International Application No. PCT/CN2017/074897 dated Sep. 12, 2017, 20 pages (with English translation).
Office Action issued in Indian Application No. 201927028105 dated Oct. 22, 2020, 7 pages.

* cited by examiner

COMMUNICATION ESTABLISHMENT METHOD AND TERMINAL

CROSS-REFERENCE TO RELATED APPLICATIONS

This application is a National Stage of International Application No. PCT/CN2017/074897, filed Feb. 25, 2017, which claims priority to Chinese Patent Application No. 201611239419.8, filed on Dec. 28, 2016. Both of the aforementioned applications are hereby incorporated by reference in their entireties.

TECHNICAL FIELD

The present invention relates to the field of communications technologies, and in particular, to a communication establishment method and a terminal.

BACKGROUND

With the development of wireless communications technologies, an increasing quantity of wireless communications modes are established between terminals, and the wireless communications modes are increasingly flexible.

Currently, commonly applied wireless communications technologies include mobile communications technologies such as a 2nd generation mobile communications technology (2G), a 3rd generation mobile communications technology (3G), and a 4th generation mobile communications technology (4G), and generally further include short-range wireless communications technologies such as a Wireless Fidelity (Wireless-Fidelity, Wi-Fi or WiFi) technology, a WiFi Direct (WiFi Direct) technology, a Bluetooth technology, an NFC technology, and a ZigBee technology.

Although there are numerous wireless communications technologies, not every terminal supports all wireless communications modes due to limitations of, for example, a size and costs of a terminal. Different wireless communications modes correspond to different wireless communications technologies, and vary in advantages and disadvantages. In daily use, a user selects a corresponding wireless communications mode based on an actual requirement or a habit of the user.

As the user requires more interactions between terminals, how to more flexibly use a communications mode supported by the terminal to establish wireless communication is a problem that needs to be resolved urgently.

SUMMARY

Embodiments of the present invention disclose a communication establishment method and a terminal, to optimize an existing communications mode, and enhance a wireless communication capability of a terminal.

According to a first aspect, an embodiment of the present invention provides a communication establishment method, including:

receiving, by a first terminal, a first broadcast message of a first wireless communications mode sent by a second terminal, where the first broadcast message carries a second wireless communications mode supported by the second terminal and a status and/or supported protocol information of the second wireless communications mode; and determining, by the first terminal based on the second wireless communications mode supported by the second terminal and the status and/or the supported protocol information of the second wireless communications mode, whether to connect to the second terminal.

According to the communication establishment method provided in this embodiment of the present invention, in a first wireless communication phase, the status or upper-layer protocol information of the second wireless communications mode can be obtained, so that devices of the second wireless communications mode may be filtered in advance, thereby improving efficiency of communication establishment.

In an optional example of the first aspect, the determining, by the first terminal based on the second wireless communications mode supported by the second terminal and the status and/or the supported protocol information of the second wireless communications mode, whether to connect to the second terminal includes:

displaying, by the first terminal, an identifier of the second terminal based on the second wireless communications mode supported by the second terminal and the status and/or the supported protocol information of the second wireless communications mode; and determining, based on selection of a user, whether to connect to the second terminal.

Information about the second communications mode is displayed on a screen, so that the user can select and determine the second terminal, and a user service is performed more conveniently, thereby improving user experience.

In an optional example of the first aspect, the status of the second wireless communications mode includes currently available or currently unavailable.

An unavailable second communications mode is checked as early as possible, so that a success rate of communication is improved.

In an optional example of the first aspect, before the determining, by the first terminal based on the second wireless communications mode supported by the second terminal and the status and/or the supported protocol information of the second wireless communications mode, whether to connect to the second terminal, the method further includes:

receiving, by the first terminal, a second broadcast message of a third terminal, where the second broadcast message carries a second wireless communications mode supported by the third terminal and a status and/or supported protocol information of the second wireless communications mode.

The method provided in the present invention is applicable to communication establishment between two terminals, and further relates to communication establishment among three or more terminals.

In an optional example of the first aspect, after the receiving, by the first terminal, a second broadcast message of a third terminal, the method further includes: displaying an identifier of the third terminal; and determining, based on selection of a user, whether to connect to the third terminal.

The user may also perform selection on three or more terminals, to improve service flexibility.

In an optional example of the first aspect, after the receiving, by the first terminal, a second broadcast message of a third terminal, the method further includes: displaying an identifier of the third terminal; and determining, based on selection of a user, whether to perform a communication group with the second terminal and the third terminal.

The first terminal can separately communicate with the second terminal, and can also establish a group with the second terminal and the third terminal, so as to improve service flexibility and multi-person service efficiency.

In an optional example of the first aspect, before the receiving, by a first terminal, a broadcast message of a first wireless communications mode sent by a second terminal, the method further includes: sending, by the first terminal, a broadcast message of the first wireless communications mode.

The method in this embodiment of the present invention is also applicable to bidirectional broadcasting, so that bidirectional discovery is performed between terminals.

In an optional example of the first aspect, the first terminal simultaneously establishes a connection of the first wireless communications mode and a connection of the second wireless communications mode to the second terminal.

According to the method in this embodiment of the present invention, the first terminal and the second terminal can simultaneously establish one or more wireless communications modes.

According to a second aspect, an embodiment of the present invention provides a communication establishment method, including: a communication establishment method, including:

obtaining, by a first terminal, a supported second wireless communications mode and a status and/or supported protocol information of the second wireless communications mode; and sending, by the first terminal, a first broadcast message of a first wireless communications mode, where the first broadcast message carries the second wireless communications mode and the status and/or the supported protocol information of the second wireless communications mode, and the first broadcast message is used by a second terminal to determine whether to connect to the first terminal.

According to the communication establishment method provided in this embodiment of the present invention, in a first wireless communication phase, the status or upper-layer protocol information of the second wireless communications mode can be obtained, so that devices of the second wireless communications mode may be filtered in advance, thereby improving efficiency of communication establishment.

In an optional example of the second aspect, before the sending, by the first terminal, a first broadcast message of a first wireless communications mode, the method further includes:

receiving, by the first terminal, a first wireless communications broadcast message of the second terminal, where the first wireless communications broadcast message is used to instruct the first terminal to send, after receiving the broadcast message, a broadcast message of the first wireless communications mode to the second terminal.

The method in this embodiment of the present invention is also applicable to bidirectional broadcasting, so that bidirectional discovery is performed between terminals.

In an optional example of the second aspect, the status of the second wireless communications mode includes currently available or currently unavailable.

An unavailable second communications mode is checked as early as possible, so that a success rate of communication can be improved.

In an optional example of the second aspect, a first wireless communications broadcast message of the second terminal that is received by the first terminal carries a third wireless communications mode supported by the second terminal and a status and/or supported protocol information of the third wireless communications mode, and the third wireless communications mode is the same as or different from the second wireless communications. The first wireless communications broadcast message may carry a plurality of supported wireless communications modes.

In an optional example of the second aspect, after the sending, by the first terminal, a first broadcast message of a first wireless communications mode, the method further includes:

receiving, by the first terminal, a connection request of the second wireless communications mode of the second terminal, and establishing a communication connection to the second terminal.

In an optional example of the second aspect, after the sending, by the first terminal, a first broadcast message of a first wireless communications mode, the method further includes: receiving a connection request of at least one third terminal; and establishing, by the first terminal, a communication group with the second terminal and the at least one third terminal.

The first terminal can separately communicate with the second terminal, and can also establish a group with the second terminal and the third terminal, so as to improve service flexibility and multi-person service efficiency.

In an optional example of the second aspect, the first terminal simultaneously establishes a connection of the first wireless communications mode and a connection of the second wireless communications mode to the second terminal.

According to the method in this embodiment of the present invention, the first terminal and the second terminal can simultaneously establish one or more wireless communications modes.

According to a third aspect, an embodiment of the present invention provides a terminal, including:

a first wireless communications module, configured to receive a first broadcast message of a first wireless communications mode sent by a second terminal, where the first broadcast message carries a second wireless communications mode supported by the second terminal and a status and/or supported protocol information of the second wireless communications mode; and a processing module, configured to determine, based on the second wireless communications mode supported by the second terminal and the status and/or the supported protocol information of the second wireless communications mode that are carried in the first broadcast message received by the first wireless communications module, whether to connect to the second terminal.

According to the communication establishment terminal provided in this embodiment of the present invention, in a first wireless communication phase, the status or upper-layer protocol information of the second wireless communications mode can be obtained, so that devices of the second wireless communications mode may be filtered in advance, thereby improving efficiency of communication establishment.

For other implementable manners of the third aspect, refer to the related content in the first to the fifth implementations of the first aspect. Details are not described herein again in the present invention.

According to a fourth aspect, an embodiment of the present invention provides a terminal, including:

a processing module, configured to obtain a supported second wireless communications mode and a status and/or supported protocol information of the second wireless communications mode;

a first wireless communications module, configured to send a first broadcast message of a first wireless communications mode, where the first broadcast message carries the second wireless communications mode and the status and/or the supported protocol information of the second wireless communications mode, and the first broadcast message is used by a second terminal to determine whether to connect to the terminal; and a second wireless communications module, configured to establish a connection of the second wireless communications mode to the second terminal.

For other implementable manners of the fourth aspect, refer to the related content in the first to the fifth implementations of the first aspect. Details are not described herein again in the present invention.

According to a fifth aspect, an embodiment of the present invention provides a terminal, including at least two wireless communications modules, and the terminal includes: one or more processors, a memory, and a bus, where the one or more processors, the memory, and the display screen communicate with each other by using the bus;

the memory is configured to store an instruction;

the at least two wireless communications modules receive and send corresponding wireless communications messages based on control of the processor; and the one or more processors are configured to invoke the instruction in the memory to perform the following steps:

receiving a first broadcast message of a first wireless communications mode sent by a second terminal, where the first broadcast message carries a second wireless communications mode supported by the second terminal and a status and/or supported protocol information of the second wireless communications mode; and determining, based on the second wireless communications mode supported by the second terminal and the status and/or the supported protocol information of the second wireless communications mode, whether to connect to the second terminal.

For other implementable manners of the fifth aspect, refer to the related content in the first to the fifth implementations of the first aspect. Details are not described herein again in the present invention.

According to a sixth aspect, a terminal is provided, including at least two wireless communications modules, and the terminal includes: one or more processors, a memory, and a bus, where the one or more processors, the memory, and the display screen communicate with each other by using the bus;

the memory is configured to store an instruction;

the at least two wireless communications modules receive and send corresponding wireless communications messages based on control of the processor; and the one or more processors are configured to invoke the instruction in the memory to perform the following steps:

obtaining a supported second wireless communications mode and a status and/or supported protocol information of the second wireless communications mode; and sending a first broadcast message of a first wireless communications mode, where the first broadcast message carries the second wireless communications mode and the status and/or the supported protocol information of the second wireless communications mode, and the first broadcast message is used by a second terminal to determine whether to connect to the terminal.

For other implementable manners of the sixth aspect, refer to the related content in the first to the fifth implementations of the first aspect. Details are not described herein again in the present invention.

According to the communication establishment terminal provided in this embodiment of the present invention, in a first wireless communication phase, the status or upper-layer protocol information of the second wireless communications mode can be obtained, so that devices of the second wireless communications mode may be filtered in advance, thereby improving efficiency of communication establishment.

BRIEF DESCRIPTION OF DRAWINGS

To describe the technical solutions in the embodiments of the present invention more clearly, the following briefly describes the accompanying drawings required for describing the embodiments or the prior art. The accompanying drawings in the following description show merely some embodiments of the present invention, and a person of ordinary skill in the art may still derive other drawings from these accompanying drawings.

DESCRIPTION OF EMBODIMENTS

To make the objectives, technical solutions, and advantages of the present invention clearer, the following further describes the specific embodiments of the present invention in detail with reference to the accompanying drawings. To make the present invention comprehensible, the following detailed description mentions many specific details. However, a person skilled in the art should understand that the present invention may be implemented without these specific details. In other embodiments, well-known methods, processes, components, and circuits are not described in detail to avoid unnecessary ambiguity of embodiments. Apparently, the described embodiments are a part rather than all of the embodiments of the present invention. All other embodiments obtained by a person of ordinary skill in the art based on the embodiments of the present invention without creative efforts shall fall within the protection scope of the present invention.

Terms used in the embodiments of the present invention are intended to better describe specific embodiments, and are not intended to limit the present invention. The terms "a", "said" and "the" of singular forms used in the embodiments and the appended claims of the present invention are also intended to include plural forms, unless otherwise specified in the context clearly. In the specification, claims, and accompanying drawings of the present invention, the terms "first", "second", "third", and so on are intended to distinguish between different objects but do not indicate a particular order. It should also be understood that, the term "and/or" used herein indicates and includes any or all possible combinations of one or more associated listed items. It should be further understood that the term "include" used in the specification specifies presence of features, integers, steps, operations, elements and/or components, with presence or attachment of one or more other features, integers, steps, operations, elements, components, and/or their combinations not excluded.

Some terms in the embodiments of the present invention are described as follows: Bluetooth (Bluetooth, BT), a basic rate (Basic Rate, BR), an enhanced data rate (Enhanced Data Rate, EDR), a high speed (High Speed, HS), and Bluetooth low energy (Bluetooth Low Energy, BLE). The Bluetooth low energy may also be referred to as low energy Bluetooth.

The "terminal" in the present invention is a terminal that can implement a wireless communication function, and the terminal may be a mobile phone, a watch, a wristband, a tablet computer, a point of sales (Point of Sales, POS), or an in-vehicle computer. This is not specifically limited in the embodiments of the present invention. In the embodiments of the present invention, for ease of description, the mobile phone and the watch are mainly used as an example for description.

Figure 1:
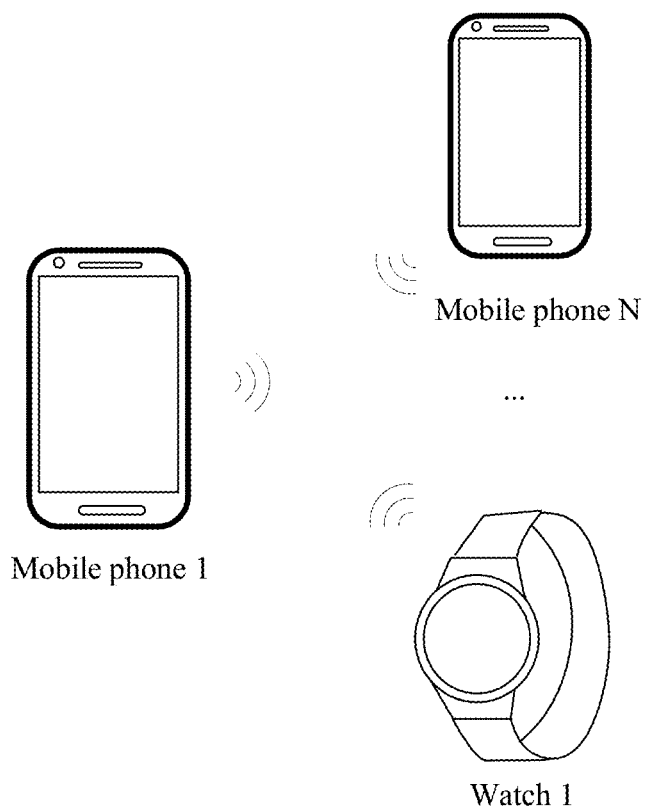
FIG. 1 is a schematic diagram of a communication connection between a mobile phone and a watch according to an embodiment of the present invention.

Referring to FIG. 1, FIG. 1 is a schematic diagram of wireless communication between a mobile phone and a mobile phone, and wireless communication between a mobile phone and a watch. It can be understood that the mobile phone and the watch in FIG. 1 are merely examples, and a terminal not shown in FIG. 1 may be another mobile phone or watch, or may be a terminal, other than a mobile phone or a watch, that has a wireless communication function.

The mobile phone and the watch may perform wireless communication by using a Bluetooth connection, for example, classic Bluetooth or BLE, or may perform communication in another wireless communications manner, such as WiFi, WiFi Direct, BR, or NFC. It can be understood that the embodiments of the present invention may further include another wireless communications manner that is not enumerated.

It can be understood that, for specific technical details of the wireless communications manner in the embodiments of the present invention, refer to a related standard or technical document. This is not described in detail in the embodiments of the present invention. For example, Bluetooth in the embodiments of the present invention is a wireless communications standard for short-range data exchange, and may include classic Bluetooth and BLE. The classic Bluetooth may also be referred to as conventional Bluetooth or standard Bluetooth. The classic Bluetooth is developed and perfected based on Bluetooth of previous Bluetooth specification versions 1.0, 1.2, 2.0+EDR, 2.1+EDR, 3.0+HS, and the like, and is a name generally called after BLE appears. Compared with BLE, currently, the classic Bluetooth is more appropriate for transmission with a relatively large data volume, for example, voice transmission or music transmission. BLE, also referred to as Bluetooth Smart or the like, is developed based on the Nokia's Wibree standard, and is originally introduced in the Bluetooth specification version 4.0. BLE, as the name indicates, consumes very low power, and power consumption is $\frac{1}{10}$ or less of that of the classic Bluetooth. BLE is characterized by a short packet, high-efficiency coding, a short connection establishment time, and the like. For a related description of the Bluetooth, see the Wikipedia content at https://en.wikipedia.org/wiki/Bluetooth, last visited on Feb. 20, 2017. A terminal that supports only a BLE connection may be referred to as a signal-mode Bluetooth terminal. A terminal that supports both a BLE connection and a classic Bluetooth connection may be referred to as a dual-mode Bluetooth terminal.

For a related description of WiFi, see the Wikipedia content at https://en.wikipedia.org/wiki/Wi-Fi, last visited on Feb. 19, 2017. For a related description of WiFi Direct, see the Wikipedia content at hasps://en.wikipedia.org/wiki/Wi-Fi_Direct, last visited on Feb. 19, 2017. For other wireless communications technologies, no further examples are listed one by one herein, and no detailed description or limitation is provided herein.

Figure 2:
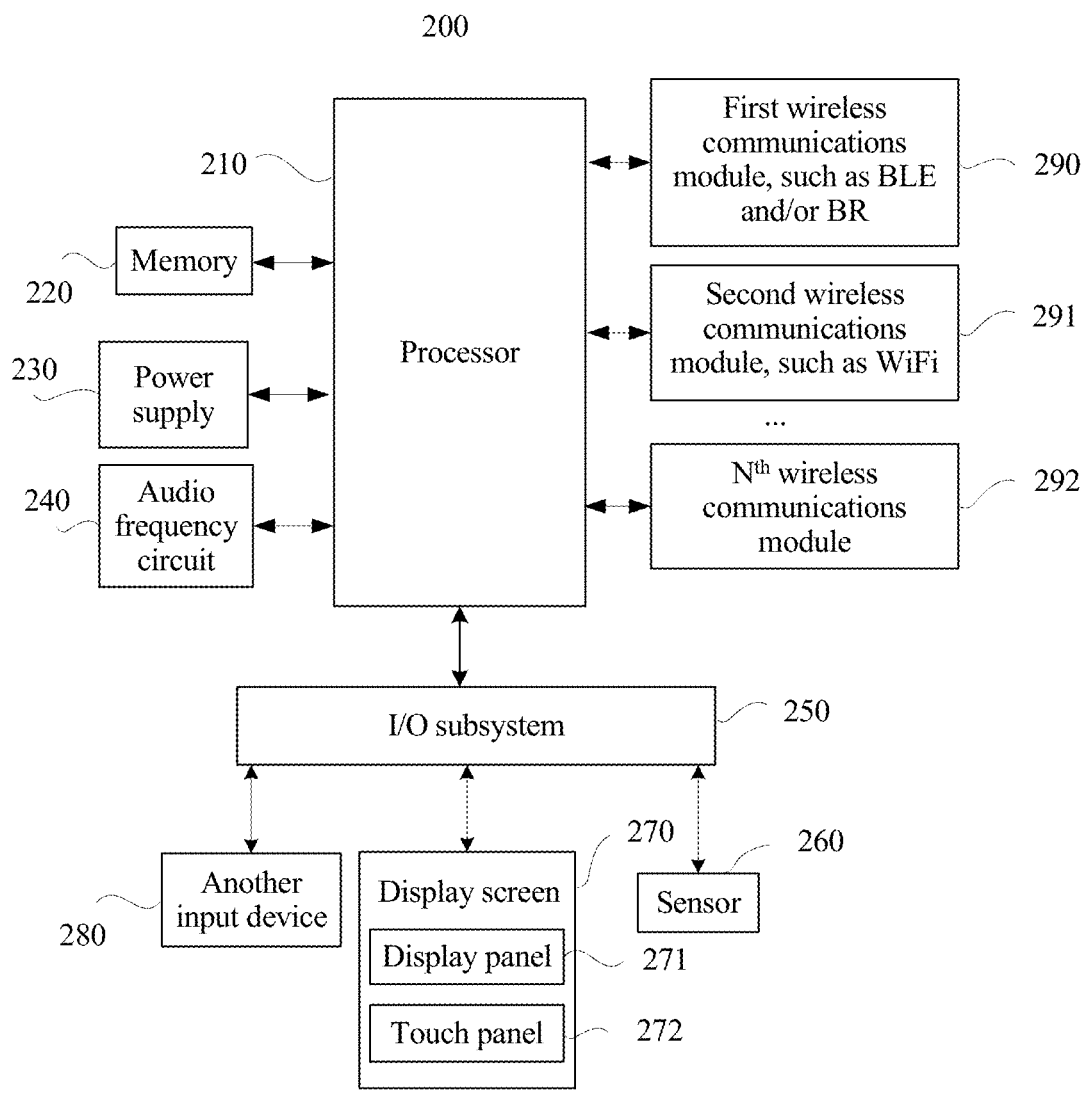
FIG. 2 is a structural diagram of hardware of a terminal according to an embodiment of the present invention.

FIG. 2 is a block diagram of a partial structure of a terminal 200 according to an embodiment of the present invention, and is applicable to the dual-mode Bluetooth terminal described in the embodiments of the present invention. Referring to FIG. 2, the terminal 200 may include components such as a processor 210, a memory 220, a power supply 230, an audio frequency circuit 240, an I/O subsystem 250, a sensor 260, a display screen 270, and another input device 280, and may further include one or more wireless communications modules such as a first wireless communications module 290, a second wireless communications module 291, or more wireless communications modules such as an Nth wireless communications module 292. A person skilled in the art may understand that the structure of a mobile terminal shown in FIG. 2 constitutes no limitation on the mobile terminal, and may include more or fewer components than those shown in the figure, or some components combined, or some components split, or components disposed differently.

The following describes each component of the terminal 200 in detail with reference to FIG. 2.

The processor 210 is a control center of the terminal 200, connects to various parts of the entire mobile terminal by using various interfaces and lines, and performs various functions of the terminal 200 and processes data by running or executing a software program and/or a module that are/is stored in the memory 220 and invoking data stored in the memory 220, so as to perform overall monitoring on the mobile terminal. Optionally, the processor 210 may include one or more processors or processing modules. Preferably, an application processor (Application Processor, AP) and a modem processor may be integrated into the processor 210. The AP mainly processes an operating system, a user interface, an application program, and the like, and the modem processor mainly processes wireless communication. In this embodiment of the present invention, a control module of a wireless communications module may be further integrated into the processor 210, so as to control to implement related functions such as a wireless communication connection and data transmission. It can be understood that, without invoking an instruction or data in the memory 220, some processors 210 may directly execute instructions configured in the processors, to complete the related function. However, for ease of description, an expression, for example, "the processor 210 invokes the instruction in the memory to perform some operations or steps" may be used in this embodiment of the present invention, and details about executing the instruction by the processor 210 are not specifically limited.

The memory 220 may be configured to store a software program and a module, and the processor 210 executes various functional applications of the terminal 200 and processes data by running the software program and the module that are stored in the memory 220. The memory 220 may mainly include a program storage area and a data storage area. The program storage area may store an operating system, an application program required by at least one function (such as control and connection functions of Bluetooth, and WiFi), and the like. The data storage area may store, for example, data that is created based on use of the terminal 200 (such as a wireless communication connection record). In addition, the memory 220 may include a high-speed random access memory, or may include a non-volatile memory, such as at least one magnetic disk storage device, a flash memory device, or another volatile solid-state storage device.

The power supply 230, such as a battery, may supply power to each component. Preferably, the power supply may be logically connected to the processor 210 by using a power supply management system, to implement functions such as charging management, discharging management, and power consumption management by using the power supply management system.

The audio frequency circuit 240 may include a microphone and a loudspeaker, and provide an audio interface between a user and the terminal 200.

The I/O subsystem 250 is configured to control an external input/output device, and may include another input device controller, a sensor controller, and a display controller.

The terminal may include the display screen 270. The display screen 270 may be configured to display information entered by a user or information provided for the user, and various menus of the terminal 200, and may further receive user input. Specifically, the display screen 270 may include a display panel 271 and a touch panel 272. The display controller in the I/O subsystem 250 may receive a signal from the display screen 270 and/or send a signal to the display screen 270, to implement man-machine interaction.

The terminal 200 may further include one or more sensors 260, such as a light sensor, a motion sensor, and another sensor. The sensor controller in the I/O subsystem 250 may receive a signal from the one or more sensors 260 and/or send a signal to the one or more sensors 260.

The another input device 280 may be configured to receive entered digit or character information, and generate key signal input related to user setting and function control of the terminal 200. One or more other input device controllers receive a signal from the another input device 280 and/or send a signal to the another input device 280.

The terminal 200 may include the first wireless communications module 290. The first wireless communications module 290 of the terminal may be a Bluetooth module. The Bluetooth module herein may be a Bluetooth module that implements a wireless communication function of BLE and/or classic Bluetooth. For example, the first wireless communications module 290 may be a Bluetooth chip. The Bluetooth chip may include a BLE controller and/or a classic Bluetooth controller. The BLE controller and the classic Bluetooth controller may implement sending and receiving of a Bluetooth radio frequency signal. For example, the BLE controller may send and receive a BLE broadcast message, and the classic Bluetooth controller may send and receive a classic Bluetooth connection request and a classic Bluetooth connection response. Certainly, the Bluetooth chip may pre-store some data related to a Bluetooth connection. If the first wireless communications module 290 is the Bluetooth chip, the terminal 200 may also control the BLE controller and the classical Bluetooth controller in the Bluetooth chip by using the control module in the processor 210.

The terminal 200 may include the second wireless communications module 291. The second wireless communications module 291 of the terminal may be a WiFi module that implements a WiFi wireless communication function of the terminal 200.

Optionally, the terminal 200 may further include a third wireless communications module or a fourth wireless communications module or more wireless communications modules, that is, the Nth wireless communications module 292. The Nth wireless communications module 292 may include, for example, an NFC module, an infrared module, and a WiFi Direct module, so as to implement a corresponding wireless communication connection. Technical and implementation details of a corresponding module are not described in detail herein.

It can be understood that the first wireless communications module 290, the second wireless communications module 291, and the Nth wireless communications module 292 are merely examples for description. A specific wireless communications mode included in the terminal 200 is not specifically limited in this embodiment of the present invention.

Although not shown, the terminal 200 may further include a radio frequency circuit, configured to receive and send information or receive and send a signal during a call. The terminal 200 may further include, for example, a camera, and details are not described herein.

FIG. 2 is a general structural block diagram of the terminal. It can be understood that different terminals may include more or fewer structures than the structure in FIG. 2. For both a terminal A and a terminal B in the following embodiments of FIG. 3 to FIG. 10, refer to the structure of the terminal in FIG. 2.

It should be noted that the terminal for implementing a communication establishment method in the following embodiments of the present invention may alternatively be a processor or a processor plus a necessary auxiliary circuit and a necessary auxiliary component, a chip or a chip group that includes a plurality of chips, or the like.

The terminal of the structure shown in FIG. 2 includes at least two wireless communications modes. In a communication process of the terminal, advantages of the communications modes may be used to improve communication efficiency or save resources. For example, the terminal may send a broadcast by using a first wireless communications mode, to search for a target communications device. In addition, a broadcast message of the first wireless communications mode may carry an identifier of a supported second wireless communications mode. In this way, if the first wireless communications mode is a wireless communications mode with low power consumption, in a process of searching for the target communications device and establishing a connection, a large amount of power may be saved, and a battery life of the terminal may be improved. For example, when the terminal A is not connected to the terminal B, the terminal A sends a BLE broadcast message, and the BLE broadcast message carries another wireless communications mode supported by the terminal A, for example, WiFi, WiFi Direct, BR, or NFC. After receiving the BLE broadcast message sent by the terminal A, the terminal B may establish a BLE connection to the terminal A, or may select to establish one or more types of wireless communication connections based on a business type that needs to be performed after the connection is established and information about the another communications mode supported by the terminal A that are carried in the BLE broadcast message sent by the terminal A.

According to the foregoing communication establishment method, flexibility of establishing wireless communication between terminals can be greatly improved. For example, if a terminal keeps broadcasting a broadcast message of the first wireless communications mode to search for a communications device, and the first wireless communications mode is a wireless communications mode with low power consumption, the terminal may quickly find another terminal that meets a condition and establish a connection to the another terminal once the another terminal enters a valid range of the broadcast message of the first wireless communications mode. In this way, power consumption can be reduced, and a speed of finding a target terminal and establishing a connection can be improved.

However, if the broadcast message of the first wireless communications mode of the terminal A carries only a wireless communications mode supported by the terminal A, when the terminal B initiates a connection based on a wireless communications mode supported by the terminal A, it is possible that the connection fails.

For example, a GC (Group Client) role in WiFi Direct can be connected to only one GO (Group Owner). If the GC has been connected to another GO, the terminal A is to reject a WiFi Direct connection from the terminal B (for example, the terminal A) in a subsequent connection process although the terminal A supports WiFi Direct communication.

Therefore, based on the foregoing method, an embodiment of the present invention provides a communication establishment method, so as to further improve a success rate of establishing a second wireless communications mode.

S102. A terminal A sends a broadcast message of a first wireless communications mode. The broadcast message carries a capability of at least one second wireless communications mode supported by the terminal A and a status of the at least one second wireless communications mode.

The terminal A may proactively send the broadcast message of the first wireless communications mode, or may send the broadcast message of the first wireless communication after receiving a first wireless broadcast message sent by a terminal B, so as to implement mutual discovery between the terminal A and the terminal B. This is not specifically limited in this embodiment of the present invention.

The capability of the second wireless communications mode that is carried in the broadcast message may be a name or an identifier of the second wireless communications mode, or may be another agreed form indicating the second wireless communications mode. This is not specifically limited in this embodiment of the present invention.

Optionally, whether the second wireless communications mode is currently available may be determined based on the status of the second wireless communications mode. Specifically, the status may include available or unavailable. For example, one bit may be used to mark the status, and 0 and 1 may respectively represent available and unavailable, or certainly, the status may be marked by using a plurality of bytes. Optionally, the status may include currently unavailable. For example, the second wireless communications mode is currently in conflict with another communications mode/service, and may be available after the another communications mode/service ends.

For example, if the broadcast message of the first wireless communications mode sent by the terminal A carries WiFi Direct information, the terminal A supports a WiFi Direct wireless communications mode. In addition, the broadcast message of the first wireless communications mode further carries information indicating whether the terminal A has currently established a WiFi Direct connection to a third terminal C. If the connection has been established, the terminal A determines whether an established WiFi Direct role is a GC role or a GO role, and determines whether a WiFi Direct connection to the terminal B may be further established.

Likewise, if the broadcast message of the first wireless communications mode sent by the terminal A carries BLE, and if the terminal A is currently in a BLE master mode, the broadcast message of the first wireless communications mode may further carry information indicating whether there is a connectable channel used to establish a connection to another BLE slave.

S104. After receiving the broadcast message of the first wireless communications mode of the terminal A, a terminal B parses the broadcast message.

After receiving the broadcast message of the first wireless communications mode of the terminal A, the terminal B parses the broadcast message based on a related protocol, to obtain content carried in the broadcast message.

The broadcast message of the first wireless communications mode carries information about the first wireless communications mode of the terminal A, for example, an identifier of the first wireless communications mode of the terminal A. After obtaining the information about the first wireless communications mode of the terminal A, the terminal B may establish a wireless connection of the first wireless communications mode to the terminal A based on related information.

Optionally, the broadcast message of the first wireless communications mode may further carry the second wireless communications mode supported by the terminal A, and the second wireless communications mode is different from the first wireless communications mode, so that after receiving the broadcast message, the terminal B can quickly learn of all or some wireless communication functions other than the first wireless communication that are currently supported by the terminal A.

Optionally, the broadcast message of the first wireless communications mode may carry not only the second wireless communications mode supported by the terminal A, but also the status of the second wireless communications mode. It can be understood that although the terminal A supports the second wireless communications mode, the terminal A may be currently incapable of establishing a wireless connection of the second wireless communications mode to the terminal B, as described in S102. The status indicates whether a connection of the second wireless communications mode supported by the terminal A can be established to the terminal B.

S106. The terminal B determines, based on the at least one second wireless communications mode and the status that are obtained through parsing, whether to establish a connection to the terminal A.

The terminal B determines, based on the information about the second wireless communications mode and the current status of the second wireless communications mode that are obtained, whether to establish the connection to the terminal A.

Optionally, the terminal B may display, to a user, some or all communications modes that are supported by the terminal A and carried in the broadcast message, and the user selects whether to perform the connection of the second wireless communications mode. Optionally, the terminal B may simultaneously display a communications mode and a current status to the user. Alternatively, the terminal B may first display, to the user, only an optional wireless communications mode supported by the terminal A, and when no connection can be established after the user selects the optional wireless communications mode, the terminal B displays, to the user, a current status of the wireless communications mode selected by the user. This is not specifically limited in this embodiment of the present invention.

Optionally, the terminal may intelligently determine, based on a wireless communications mode supported by the terminal A and a status of the wireless communications mode, whether to establish the connection of the second wireless communications mode to the terminal A, without selection performed by the user. For example, the terminal B may intelligently determine, based on a currently performed business type or current quality of the second wireless communications mode, whether to establish the connection of the second wireless communications mode to the terminal A.

S108. The terminal B establishes a second wireless communication connection to the terminal A.

In an example, when determining to establish the connection of the second wireless communications mode to the terminal A, the terminal B may directly initiate the connection based on the information about the second wireless communications mode carried in the broadcast message of the first wireless communications mode. In an example, when determining to establish the connection of the second wireless communications mode to the terminal A, the terminal B may alternatively first send a broadcast message of the second wireless communications mode to the terminal A, and after receiving the broadcast message of the second wireless communications mode of the terminal B, the terminal A initiates the connection of the first wireless communications mode. Alternatively, the terminal B first sends a broadcast message of the second wireless communications mode to the terminal A, and after receiving a response message for the broadcast message of the terminal A, initiates the connection of the first wireless communications mode. This is not specifically limited in this embodiment of the present invention.

According to the foregoing method provided in this embodiment of the present invention, in a first wireless communication phase, the status of the second wireless communications mode can be obtained, and terminals are filtered in advance, so as to avoid a case in which terminals cannot establish a connection to each other because a communication interface of the second wireless communications mode is currently unavailable when the terminals perform the connection, thereby optimizing establishment of the second wireless communications mode.

To optimize establishment of a second wireless communications mode, an embodiment of the present invention further provides a communication establishment method.

In a process of establishing a connection of a wireless communications mode, a terminal A sends a broadcast message of a first wireless communications mode, where the broadcast message carries at least one second wireless communications mode supported by the terminal A, and a terminal B may establish a connection of at least one first wireless communications mode to the terminal A after receiving the broadcast message of the terminal A. According to the foregoing communication establishment method, generally, a communication link of the second wireless communications mode between the terminal A and the terminal B can be effectively and quickly established. However, in some scenarios, a time for establishing a communication connection between application layers of the terminal A and the terminal B is relatively long. A reason is that different communications modes correspond to different protocols, and a same communications mode may support different protocols at different protocol layers.

For example, in addition to information about the second wireless communications mode, the first wireless communications mode may further carry information about protocols supported by, for example, a data link layer, a connection layer, and a network layer of the second wireless communications mode, for example, information about whether the terminal A supports IP, TCP, UDP, various self-developed protocols, and the like. For each wireless communications mode, underlying communications protocols supported by the terminal are basically the same. However, because terminals vary in form, not all upper-layer protocols supported by the terminals are the same, for example, not all terminals support IP, TCP, UDP, or the various self-developed protocols. Therefore, in a process of establishing a connection between the terminal A and the terminal B, a connection at an underlying physical layer can be established. However, protocols supported by upper layers are different, and consequently interworking between application layer protocols cannot be implemented.

According to the communication establishment method provided in this embodiment of the present invention, in a first wireless communication phase, upper-layer protocol information of the second wireless communications mode can be obtained, so that devices of the second wireless communications mode may be filtered in advance, and a protocol of the second wireless communications mode may be conveniently negotiated in advance with a peer end device. This avoids a case in which although a physical layer connection to a selected device can be established, devices actually cannot interwork with each other because data link layers, connection layers, network layers, or application layers of the devices support different protocols, thereby reducing a time for establishing a connection.

For the foregoing scenario, an embodiment of the present invention provides another communication establishment method.

S202. A terminal A sends a broadcast message of a first wireless communications mode. The broadcast message carries a capability of at least one second wireless communications mode supported by the terminal A, and supported protocol information of the at least one second wireless communications mode.

Optionally, the supported protocol information of the at least one second wireless communications mode that is carried in the broadcast message may be all protocol information of a corresponding wireless communications mode, or may be only protocol information of a plurality of optional protocol layers included in a corresponding protocol layer. This is not specifically limited in this embodiment of the present invention.

For content that is the same as or similar to step S102, refer to the description in S102, and details are not described herein again.

S204. After receiving the broadcast message of the first wireless communications mode of the terminal A, a terminal B parses the broadcast message.

After receiving the broadcast message of the first wireless communications mode of the terminal A, the terminal B parses the broadcast message based on a related protocol, to obtain content carried in the broadcast message.

The broadcast message of the first wireless communications mode carries information about the first wireless communications mode of the terminal A, for example, an identifier of the first wireless communications mode of the terminal A. After obtaining the information about the first wireless communications mode of the terminal A, the terminal B may establish a wireless connection of the first wireless communications mode to the terminal A based on related information.

Optionally, the broadcast message of the first wireless communications mode may further carry the second wireless communications mode supported by the terminal A, and the second wireless communications mode is different from the first wireless communications mode, so that after receiving the broadcast message, the terminal B can quickly learn of all or some wireless communication functions other than the first wireless communication that are currently supported by the terminal A.

Optionally, the broadcast message of the first wireless communications mode may carry not only the second wireless communications mode supported by the terminal A, but also the protocol information of the second wireless communications mode. It can be understood that although the terminal A supports the second wireless communications mode, the terminal A may be currently incapable of successfully establishing a wireless connection of the second wireless communications mode to the terminal B.

For example, both the terminal A and the terminal B support the second wireless communications mode. A transport layer of the terminal A supports TCP (Transmission Control Protocol, Transmission Control Protocol) and a UDP protocol, and a transport layer of the terminal B supports the TCP protocol and the UDP protocol. Therefore, when the terminal A and the terminal B establish a connection of the second wireless communications mode, the transport layer may use the TCP protocol or the UDP protocol. However, if a transport layer of a terminal C supports the UDP protocol but does not support the TCP protocol, and the terminal A needs to connect to the terminal C, or the terminal B needs to connect to the terminal C, or networking needs to be performed on the terminal A, the terminal B, and the terminal C to perform communication, only the UDP protocol can be selected as a transport layer protocol.

S206. The terminal B determines, based on the at least one second wireless communications mode and the supported protocol information that are obtained through parsing, whether to establish a connection to the terminal A.

The terminal B selects, based on the obtained supported protocol information of the terminal A, a protocol supported by both the terminal A and the terminal B to perform the connection.

If no protocol is supported by both the terminal A and the terminal B, the terminal B does not initiate the connection to the terminal A. For example, the transport layer of the terminal A supports the TCP protocol, the transport layer of the terminal B supports a CoAP protocol but does not support the TCP protocol, and no other protocols are supported by both the transport layers of the terminal A and the terminal B. Therefore, the terminal B may determine to establish no connection to the terminal A.

Optionally, when the terminal B establishes no connection to the terminal A, the terminal B may prompt a user. For example, the terminal may dim an identifier of the terminal A displayed in devices that can be connected; or an identifier of the terminal A is marked with information such as "protocol/version mismatch"; or a dialog box pops up to notify the user that the terminal cannot be connected or notify the user of "protocol/or version mismatch". For how to prompt the user, there may be many implementations. This is not specifically limited in the present invention.

S208. The terminal B establishes a second wireless communication connection to the terminal A.

If the terminal A and the terminal B include a same protocol at each protocol layer, the terminal B establishes the second wireless communication connection to the terminal A. The second wireless communication connection between the terminal B and the terminal A may be directly initiated by the terminal B; or the terminal B may first send a broadcast message of the second wireless communications mode, and then the terminal A initiates the connection; or after the terminal B sends a broadcast message of the second wireless communications mode, the terminal B may initiate the connection of the second wireless communications mode after receiving a broadcast message response of the terminal A. There may be another implementation in this sense, and this is not specifically limited in this embodiment of the present invention.

According to the method in this embodiment of the present invention, in a first wireless communication phase, upper-layer protocol information of the second wireless communications mode can be obtained, so that devices of the second wireless communications mode may be conveniently filtered in advance, and a negotiation with a peer end device may be conveniently performed in advance on a data link layer protocol, a connection layer protocol, a network layer protocol, and an upper-layer application layer protocol of the second wireless communications mode. This avoids a case in which although a physical layer connection to a selected to-be-connected device can be established, interworking between data link layer protocols, connection layer protocols, network layer protocols, or application layer protocols cannot be implemented, thereby reducing a time for connecting upper-layer applications.

Figure 3:
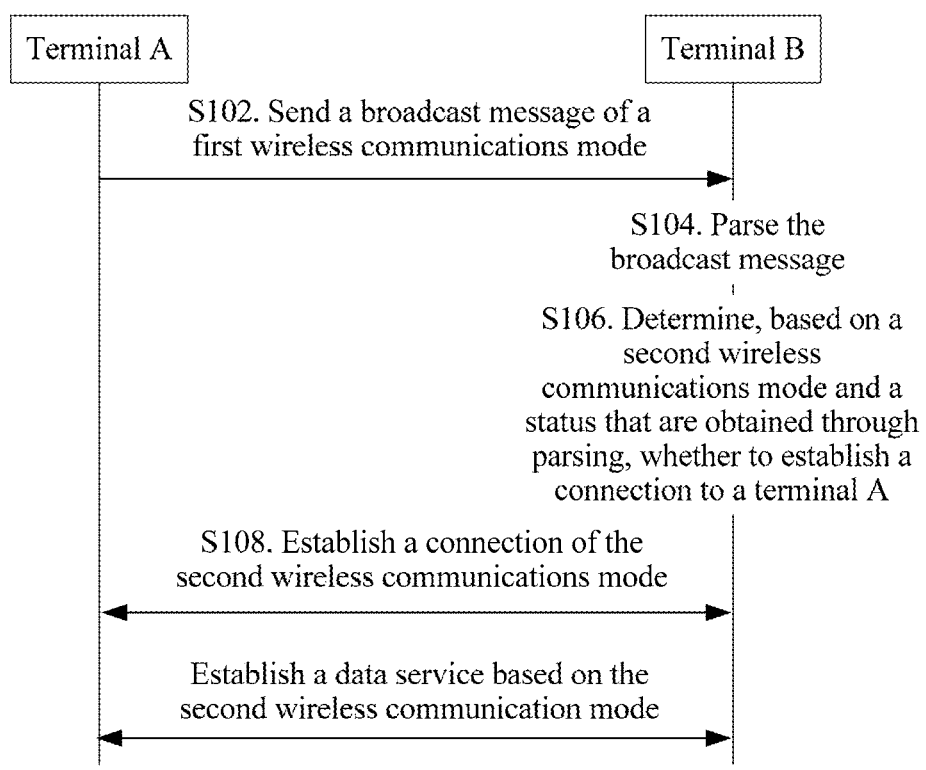
FIG. 3 is a schematic diagram of a communication establishment method according to an embodiment of the present invention.
Figure 4:
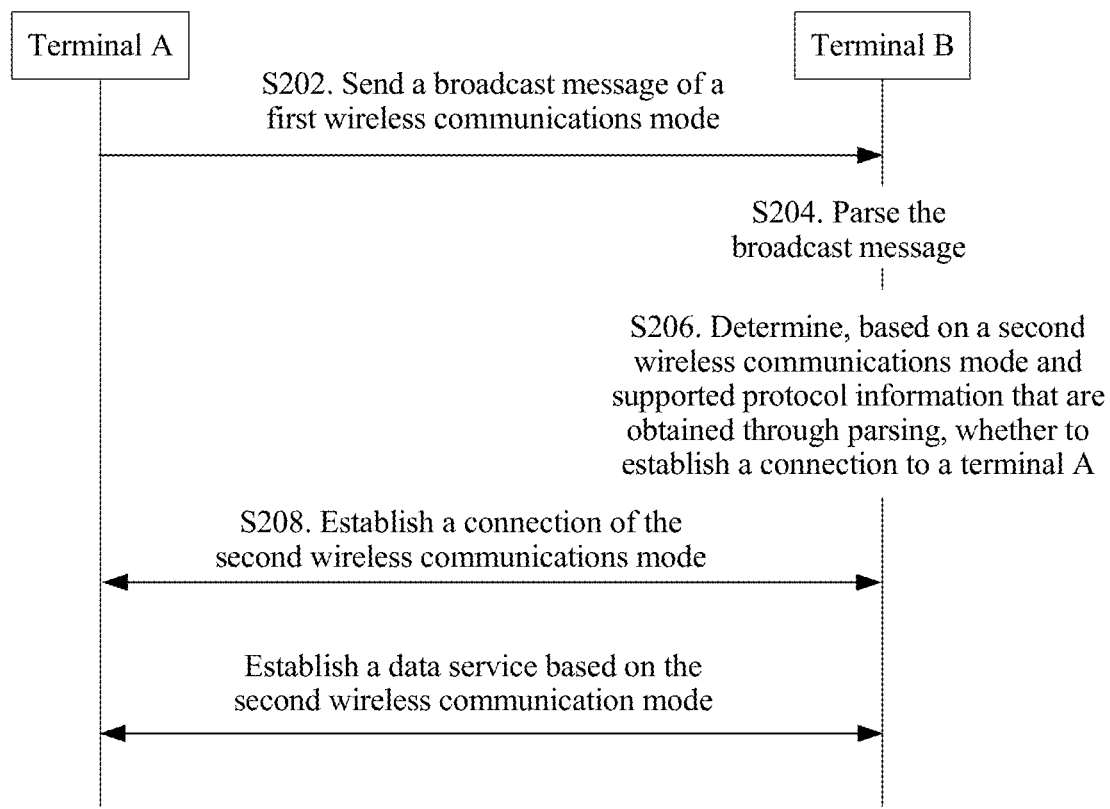
FIG. 4 is a schematic diagram of another communication establishment method according to an embodiment of the present invention.

Based on the foregoing communication establishment methods provided in FIG. 1 and FIG. 2, an embodiment of the present invention may further provide another communication establishment method, as shown in FIG. 3. To be specific, when a terminal A sends a broadcast message of a first wireless communications mode, the broadcast message carries not only a status of at least one second wireless communications mode, but also supported protocol information. That is, in step S302, the broadcast message of the first wireless communications mode sent by the terminal A carries an identifier of the second wireless communications mode, the status of the second wireless communications mode, and the supported protocol information.

Figure 5:
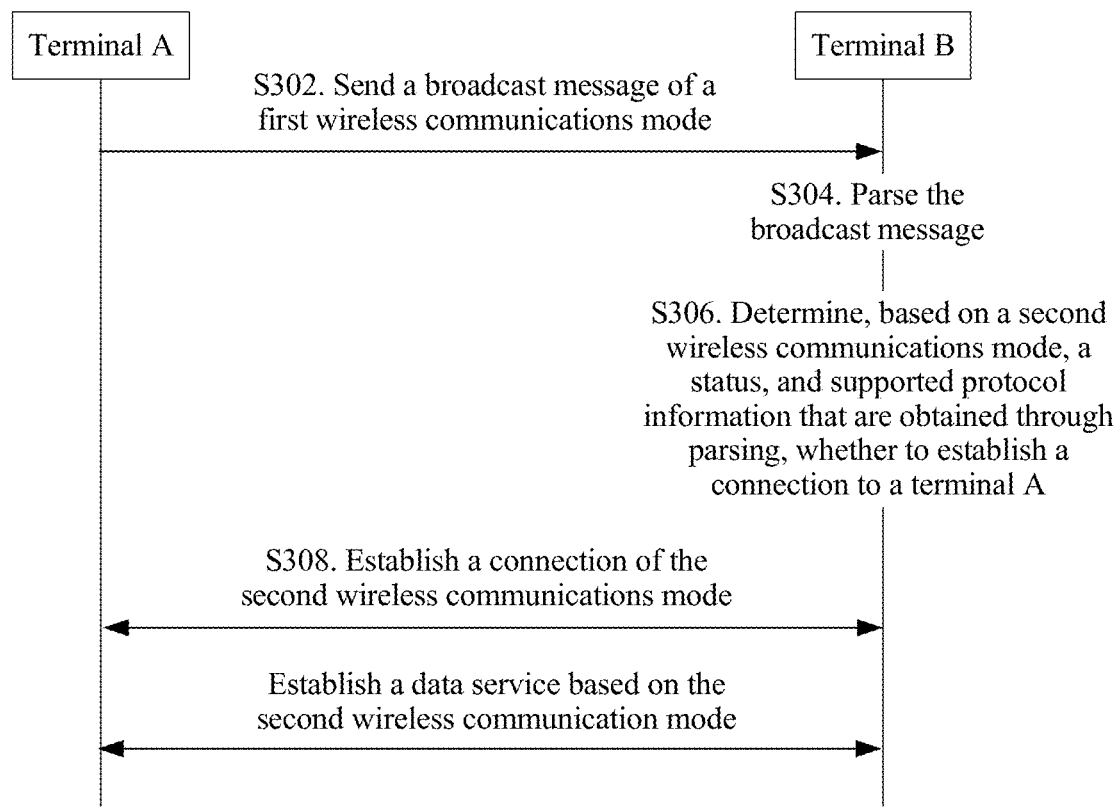
FIG. 5 is a schematic diagram of another communication establishment method according to an embodiment of the present invention.

For details of steps S302 to S308 in FIG. 5, refer to same or similar technical details in steps S102 to S108 in FIG. 1 and/or steps S202 to S208 in FIG. 2, and details are not described herein again.

According to the method shown in FIG. 5 in this embodiment of the present invention, the status and the protocol information of the second wireless communications mode are comprehensively considered, so that efficiency of communication establishment can be further improved.

Figure 6:
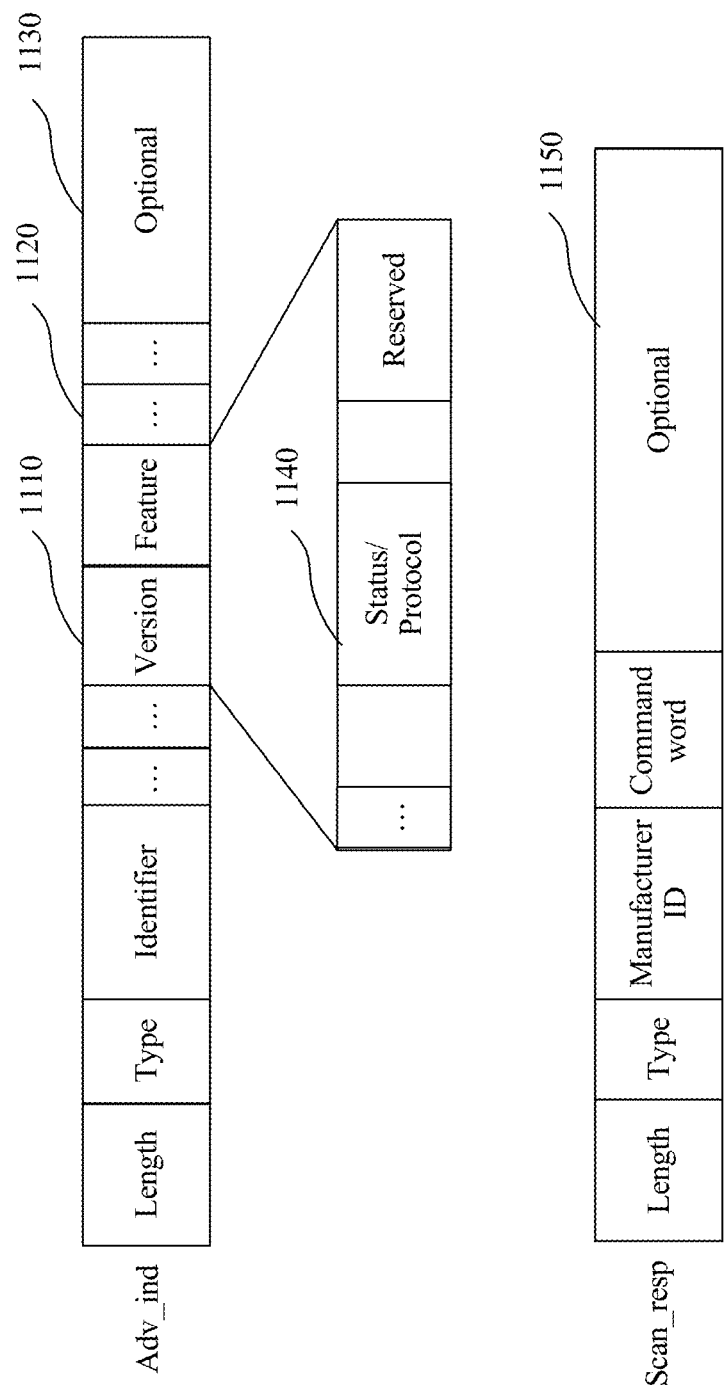
FIG. 6 is a schematic diagram of a BLE broadcast message according to an embodiment of the present invention.

In an optional implementation, considering that the broadcast message of the first wireless communications mode needs to carry a large amount of information, in actual application, upper-layer services may be classified into different business types (business type). For different business types, a corresponding capability, status, or protocol information is carried in the broadcast message. As shown in FIG. 6, a BLE broadcast message is used as an example. The terminal A or the terminal B may add a capability, a status, and protocol information of the second wireless communications mode to a version and feature field 1110 in the BLE message, for example, a status/protocol 1140 in the figure; or the terminal A or the terminal B may add the foregoing information to an optional field 1130 of the BLE message. Optionally, the capability, the status, and the protocol information of the second wireless communications mode may alternatively be carried in another part that is not shown, such as an ellipsis part 1120 in the figure.

In an optional example, for a broadcast discovery protocol having no business type (Business Type), a plurality of business IDs (Business ID) may be combined in a broadcast message, to perform broadcasting and reverse broadcasting, and a broadcast message and a reverse broadcast message may carry most basic capability and status fields. For example, as shown in FIG. 6, the ellipsis part 1120 may include a field Central Unavailable, indicating that a BLE master has no capability to connect to more BLE slaves. Optionally, the BLE broadcast message (Adv_ind) shown in FIG. 6 may include a field Peripheral Unavailable, indicating that a BLE slave has been occupied by a device, and cannot respond to another device.

In another optional example, different services may be classified. For example, services may be classified into: token exchange (Token), real-time message push (Message), a file (Resource), a streaming media (Streaming), and the like. The type of token exchange may be a BSSID of a router, password exchange, or the like. The type of real-time message push may be an incoming call or SMS push. The type of file may be a picture, file transmission, or the like. The type of streaming media may be a real-time audio and video, or the like.

For a discovery protocol having a business type, a capability field may be added for a corresponding business type, to exchange capabilities corresponding to the business type. For example, an identifier of a business type performed by a transmit terminal and a receive terminal may be added to the ellipsis part 1120, and the capability, the status, and the protocol information of the second wireless communications mode are selectively carried based on the business type.

In an optional example, if a relatively large amount of content needs to be carried, for example, a manufacturer account for login, or displayed nickname information needs to be carried, there is not much space left in a broadcast body in the broadcast message. In this case, a broadcast format may be slightly adjusted, and the capability field is added to another message body, for example, a BLE scan response (scan_resp). In this embodiment of the present invention, content carried in the BLE scan response (scan_resp) may also be considered to be carried in the BLE broadcast message. Optionally, for a field carried in the broadcast message, a name of a maximum length that can be sent may be obtained through cutting based on a length of the capability field. Optionally, an optional field may be filled by using a TLV format, and a total length of a data header (Type and Length) is one byte.

In this embodiment of the present invention, a specific scenario is used as an example to describe the foregoing disclosed method.

Figure 7:
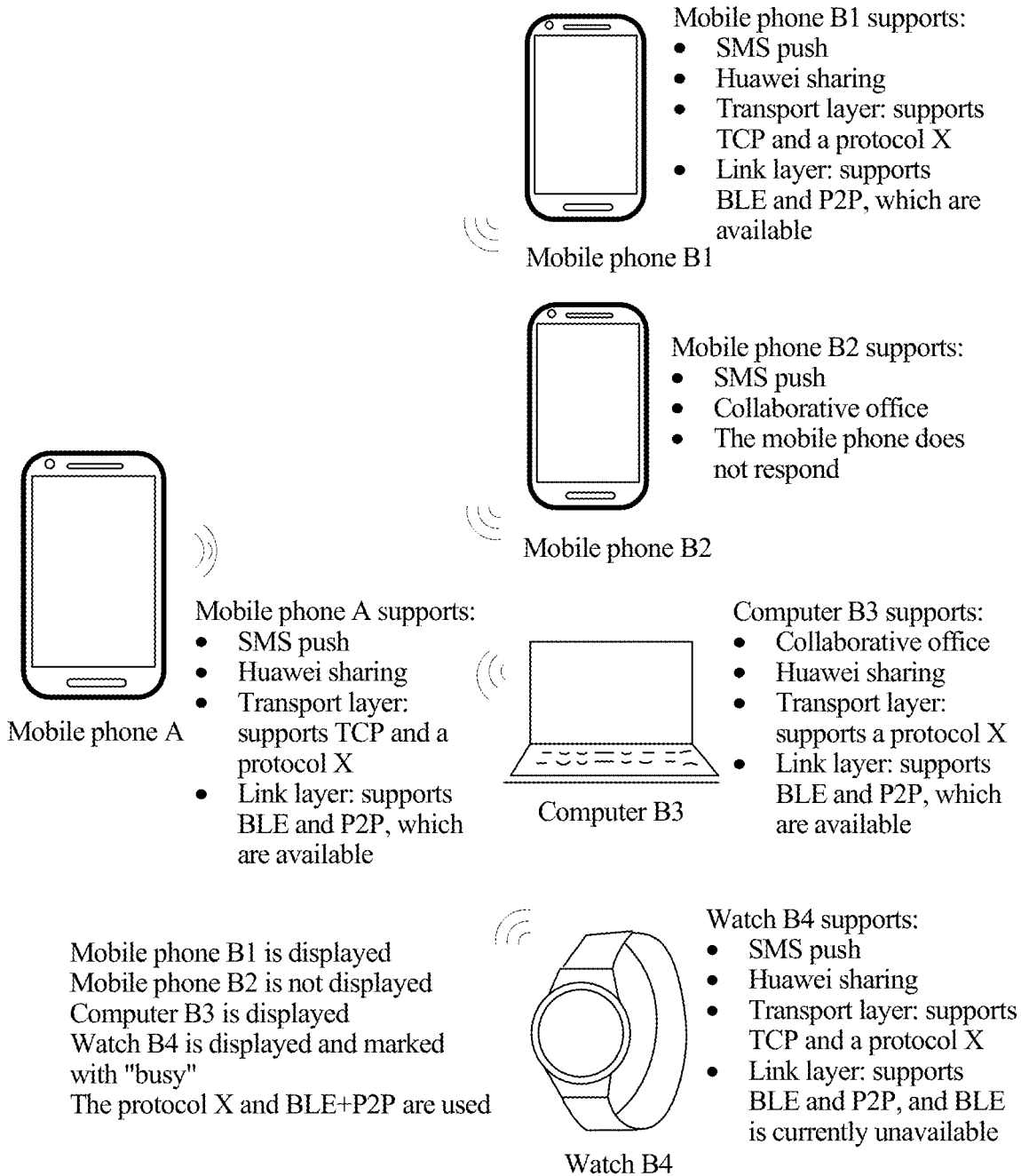
FIG. 7 is a schematic diagram of a specific scenario of a communication establishment method according to an embodiment of the present invention.

As shown in FIG. 7, a mobile phone A wants to share a file or establish a communication group with a surrounding device. The mobile phone A is a mobile phone of a current user, and is referred to as a terminal A in the following. A mobile phone B1, a mobile phone B2, a computer B3, and a watch B4 are surrounding devices, and belong to a terminal B in the following description, that is, the terminal B in the following may be one or more terminals.

The mobile phone A supports SMS push and Huawei sharing services. A transport layer of the mobile phone A supports TCP and a protocol X. The protocol X may be a self-developed protocol of a manufacturer, or may be a protocol other than TCP. A link layer supports BLE and WiFi Direct (or referred to as WiFi P2P) protocols.

The mobile phone B1 included in the terminal B supports the SMS push and Huawei sharing services. A transport layer of the mobile phone B1 supports TCP and the protocol X. A link layer supports the BLE and WiFi Direct (or referred to as WiFi P2P) protocols.

The mobile phone B2 included in the terminal B supports SMS push and collaborative office services. The mobile phone B2 does not respond to, for example, received BLE and/or WiFi Direct.

The computer B3 included in the terminal B supports collaborative office and Huawei sharing services. A transport layer of the computer B3 supports the protocol X. A link layer supports the BLE and WiFi Direct (or referred to as WiFi P2P) protocols.

The watch B4 included in the terminal B supports the SMS push and Huawei sharing services. A transport layer of the watch B4 supports TCP and the protocol X. A link layer supports the BLE and WiFi Direct (or referred to as WiFi P2P) protocols, but BLE is currently unavailable, for example, BLE is currently used for another service.

Figure 8:
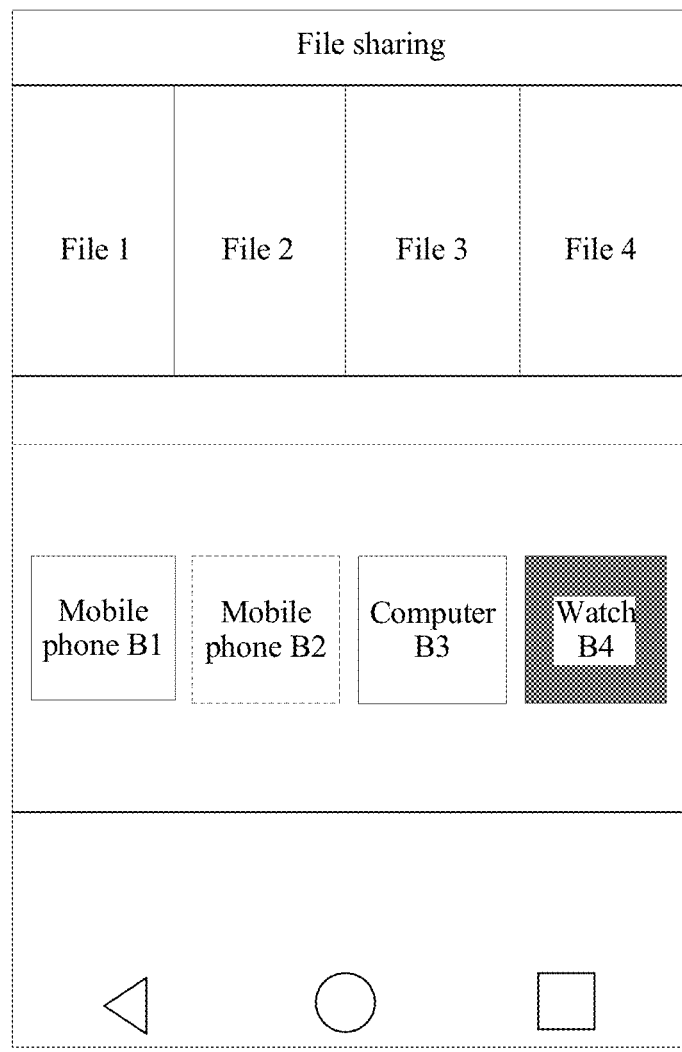
FIG. 8 is a schematic diagram of a display screen according to an embodiment of the present invention.

The terminal A may find and obtain a situation of each device in the terminal B by using a BLE broadcast message. After receiving a broadcast message of the terminal B, the terminal A may display a status of the terminal B on a screen. In addition, the terminal A comprehensively considers situations of all terminals, to initiate file sharing or establish a communication group to perform another service. For example, as shown in FIG. 8, the screen of the mobile phone A may display the mobile phone B1, the computer B3, and the watch B4. Because BLE is currently unavailable, the watch B4 may be marked with a different color, or may be marked with "busy" or a similar identification, for example, the "watch B4" in FIG. 8, or may not be marked. Because the mobile phone B2 does not reply to the BLE broadcast message, the mobile phone A does not find the mobile phone B2, and the mobile phone B2 is not displayed. Alternatively, the mobile phone B2 may send a broadcast message, but does not reply to the BLE broadcast message. In this case, the mobile phone B2 may also be displayed, but the mobile phone B2 is marked as unconnectable, for example, the "mobile phone B2" shown in FIG. 8.

Optionally, the terminal A may initiate a connection based on a communications mode supported by each terminal, a current status of each communications mode, a supported protocol, and the like. For example, the mobile phone A may determine, based on situations of the mobile phone A, the mobile phone B1, the mobile phone B2, the computer B3, and the watch B4, to initiate a connection between the mobile phone A and each of the mobile phone B1, the computer B3, and the watch B4.

Figure 9:
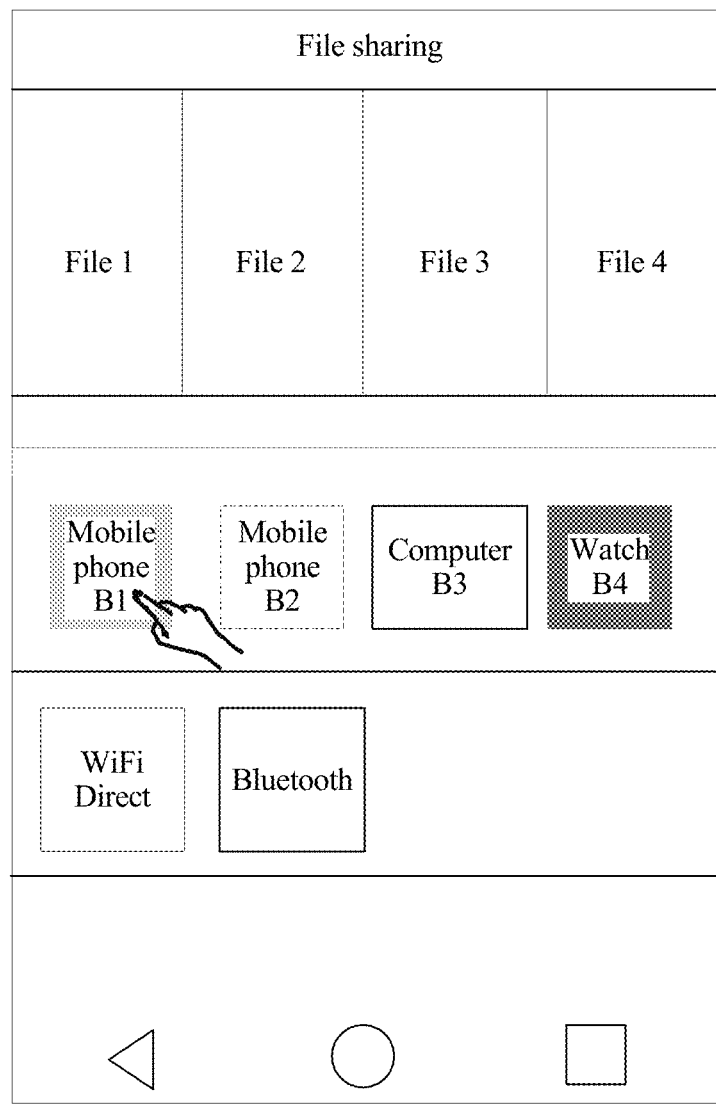
FIG. 9(a) and FIG. 9(b) are schematic diagrams of another display and operation screen according to an embodiment of the present invention.
Figure 9:
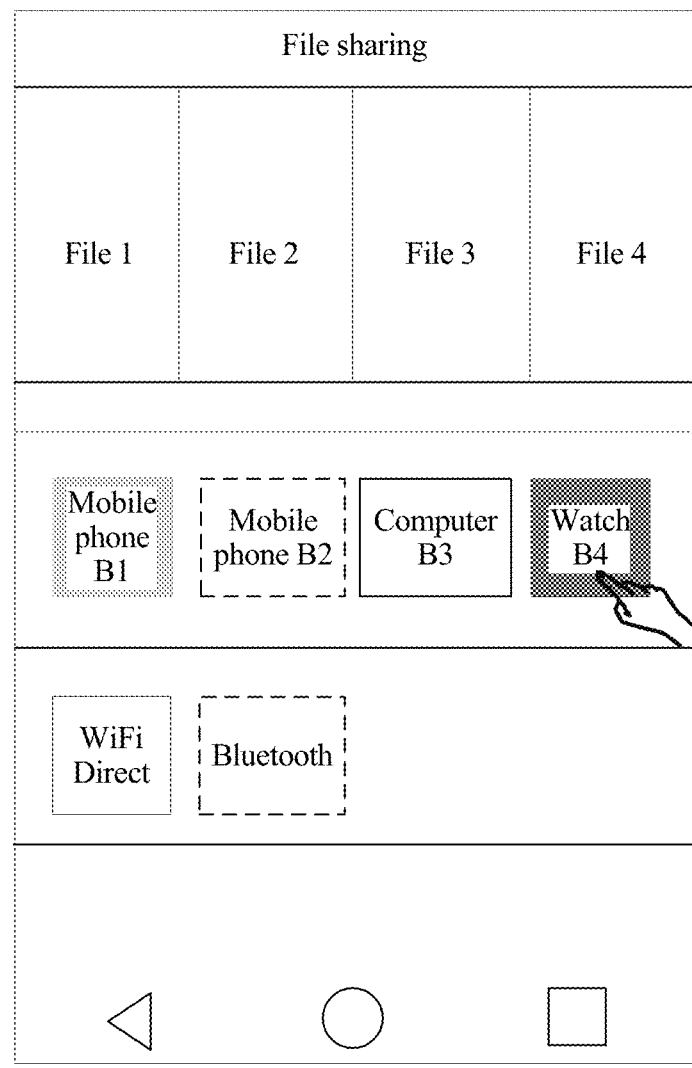

The user may select, by using a display screen, one or more terminals to perform a connection and transmit data. After receiving broadcast messages sent by all surrounding terminals, the terminal A may separately obtain a situation of each terminal through parsing. The user may also learn of or select, by using the screen, a terminal and an available connection manner to perform communication. For example, as shown in FIG. 9(a), the user taps an identifier (icon) of the "mobile phone B1" displayed on the screen of the mobile phone A, to learn that the mobile phone B1 supports WiFi Direct and Bluetooth, and the mobile phone A can establish a WiFi Direct connection and/or a Bluetooth connection to the mobile phone B1. For another example, as shown in FIG. 9 b), the user taps an identifier (icon) of the "watch B4" displayed on the screen of the mobile phone A, to learn that the watch B4 supports WiFi Direct and the Bluetooth is currently unavailable, and the mobile phone A can currently establish a WiFi Direct connection to the watch B4. In an optional example, the user may alternatively directly initiate a communication group for communication between the mobile phone A and each of the mobile phone B1, the computer B3, and the watch B4. A screen display manner and a specific manner of initiating a connection are not specifically limited in this embodiment of the present invention.

For a specific protocol, the transport layer may use the protocol X, and the link layer may use protocols related to BLE and WiFi Direct. In an optional example, the mobile phone A may establish only a BLE connection or a WiFi Direct connection to a device in the terminal B. The mobile phone A may alternatively establish a BLE connection and a WiFi Direct connection to a device in the terminal B. The mobile phone A may perform data exchange of a same service based on one or more established links.

Figure 10:
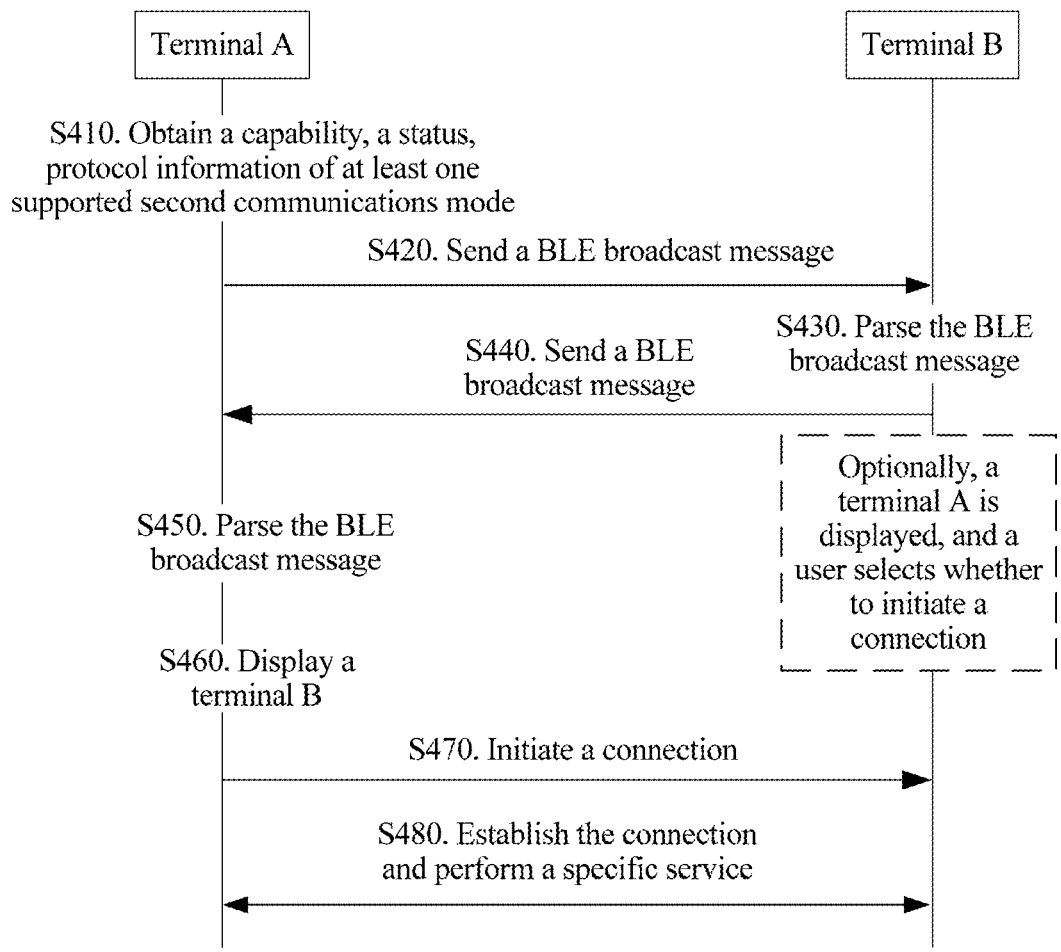
FIG. 10 is a schematic diagram of another communication establishment method according to an embodiment of the present invention.
Figure 11:
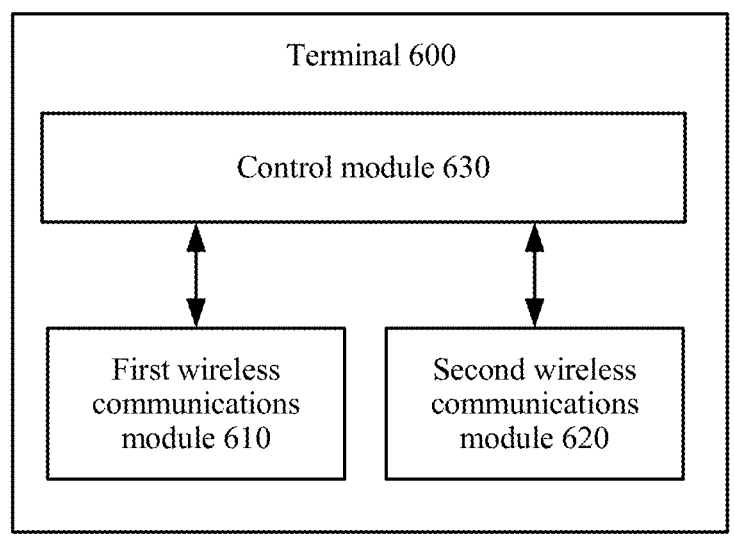
FIG. 11 is a schematic structural diagram of a terminal according to an embodiment of the present invention.

For the foregoing scenario, an embodiment of the present invention provides a communication establishment method shown in FIG. 10. For a part that is the same as or similar to the foregoing methods in FIG. 3 to FIG. 5, refer to the foregoing description, and details are not described again in this embodiment.

S410. A terminal A obtains a capability of at least one supported second wireless communications mode, and a status of the at least one second wireless communications mode. In addition, the terminal A may obtain supported protocol information of the at least one second wireless communications mode.

The terminal A may encapsulate the capability of the second wireless communications mode, for example, whether the second wireless communications mode is supported, an identifier of the second wireless communications mode, the current status of the second wireless communications mode, and the supported protocol information of the second wireless communications mode into a broadcast message of a first wireless communications mode, for example, BLE. In the following, that the first wireless communications mode is BLE is used as an example for description.

Specifically, the identifier of the second wireless communications mode that is carried in the broadcast message may be a name or a code name of the second wireless communications mode, or may be another agreed form. This is not limited in this embodiment of the present invention.

The status of the second wireless communications mode may include available or unavailable, and may further include unavailable that is caused because the second wireless communications mode is currently occupied, and the like.

Optionally, the supported protocol information of the second wireless communications mode that is carried in the broadcast message may be all protocol information related to the second wireless communications mode, or may be only some protocol information. For example, the broadcast message carries only protocol information of a plurality of optional protocols included in a protocol layer.

S420. The terminal A sends a BLE broadcast message. The broadcast message carries the capability, the status, the protocol information, and the like of the second wireless communications mode, so that a surrounding device finds and learns of a situation of the terminal A.

S430. A terminal B receives the BLE broadcast message sent by the terminal A, and parses the BLE broadcast message.

The terminal B may obtain the at least one second wireless communications mode added by the terminal A to the BLE broadcast message, and the status and a supported protocol of the at least one second wireless communications mode.

S440. After receiving and parsing the BLE broadcast message of the terminal A, the terminal B adds at least one second wireless communications mode supported by the terminal B, a corresponding status, and supported protocol information to a BLE broadcast message, and sends the BLE broadcast message to a surrounding device.

Optionally, the terminal B may also display an identifier of the surrounding device on a screen based on a received BLE broadcast message sent by the surrounding device. A display manner may be similar to that shown in FIG. 8. This is not specifically limited in this embodiment of the present invention.

The terminal B may alternatively add one or more of the capability, the status, or the protocol information of the at least one supported second wireless communications mode to a BLE scan response (Scan_resp) frame. In this embodiment of the present invention, the one or more of the capability, the status, and the protocol information of the at least one second wireless communications mode being added by the terminal B to the BLE scan response (Scan_resp) frame is also considered as being added to the BLE broadcast message.

S450. The terminal A receives and parses the BLE broadcast message of the terminal B.

S460. The terminal A displays, on a screen, devices in the terminal B based on the at least one second wireless communications mode, and the status and a supported protocol that are corresponding to the at least one second wireless communications mode that are carried in the BLE broadcast message of the terminal B, as shown in FIG. 8.

S470. A user may determine, based on surrounding devices displayed on the screen, to initiate a connection to one or more terminals in the surrounding devices. For example, the user may select, by tapping to select a terminal identifier displayed in FIG. 8, an object to which a connection is to be initiated.

The terminal A may alternatively automatically initiate a connection based on a status of the surrounding device.

S480. The terminal A and the terminal B perform a specific service based on the established connection.

After establishing a communication connection to the terminal B, the terminal A may send an instant message, a shared file, a real-time audio/video, or the like based on the communication connection.

It can be understood that the terminal A may alternatively first send a BLE broadcast message to search for a surrounding device, and after receiving a BLE broadcast message of the surrounding device, the terminal A sends a BLE broadcast message again, and the BLE broadcast message carries at least one second wireless communications mode and a status and a supported protocol of the at least one second wireless communications mode. For example, before S310, the terminal A sends a BLE broadcast message, and the broadcast message may carry no supported second wireless communications mode. The broadcast message instructs a surrounding terminal to send a BLE broadcast message or a BLE broadcast response message after receiving the BLE broadcast message, so that the terminal A finds the surrounding terminal. This embodiment of the present invention is not specifically limited in this sense.

As shown in FIG. 10, an embodiment of the present invention further provides a schematic block diagram of a terminal, so as to implement the communication establishment methods shown in FIG. 3 to FIG. 5 and FIG. 10. It can be understood that, for specific implementation details of executing the foregoing methods by the terminal shown in FIG. 10, refer to the related descriptions in FIG. 3 to FIG. 10. Details are not described herein again. Both the features and the technical effects in FIG. 3 to FIG. 10 are applicable to the terminal 600. It can be understood that the terminal shown in FIG. 6 is applicable to the terminal A and the terminal B in the foregoing methods, for example, the mobile phone A, the mobile phone B1, the mobile phone B2, the computer B3, and the watch B4.

The terminal 600 includes a first wireless communications module 610, a second wireless communications module 620, and a processing module 630.

The first wireless communications module 610 may be configured to receive and send messages of a first wireless communications mode, including a broadcast message, a connection request message, or the like of the first wireless communications mode.

The second wireless communications module 620 may be configured to receive and send messages of a second wireless communications mode, including a broadcast message, a connection request message, or the like of the first wireless communications mode.

The processing module 630 may be configured to control the first wireless communications module 610 and the second wireless communications module 620. Specifically, the processing module 630 may control whether to enable (enable) the first wireless communications module 610 and/or the second wireless communications module 620 to send and receive a broadcast message, a connection request, or the like. The processing module 630 may further obtain device information, for example, a Bluetooth address and a WiFi address. Optionally, the processing module 630 may further generate a ciphertext, and perform matching on the ciphertext, for example, encrypt content to-be-sent by each wireless communications module and decrypt content received by each wireless communications module.

Specifically, the terminal 600 corresponds to the terminal A in FIG. 3 to FIG. 5 and FIG. 10, and may specifically include the first wireless communications module 610, the second wireless communications module 620, and the processing module 630.

The first wireless communications module 610 may be configured to receive a first broadcast message of a first wireless communications mode sent by a second terminal, where the first broadcast message carries a second wireless communications mode supported by the second terminal and a status and/or supported protocol information of the second wireless communications mode.

The processing module 630 may be configured to determine, based on the second wireless communications mode supported by the second terminal and the status and/or the supported protocol information of the second wireless communications mode, whether to connect to the second terminal.

The second wireless communications module 620 may be configured to: if the processing module 630 determines to perform a connection of the second wireless communications mode to the second terminal, initiate, to the second terminal, the connection of the second wireless communications mode.

Optionally, the terminal 600 may further include a display module, and the display module may be configured to display an identifier of the second terminal based on the second wireless communications mode supported by the second terminal and the status and/or the supported protocol information of the second wireless communications mode.

Optionally, the processing module 630 may be further configured to determine, based on selection of a user, whether to connect to the second terminal.

Optionally, the terminal 600 may further include a plurality of wireless communications modules such as a third wireless communications module and a fourth wireless communications module.

Optionally, the terminal 600 may simultaneously use the first wireless communications module 610 and the second wireless communications module 620 to establish a connection of a wireless communications mode and cooperatively complete a same service.

Optionally, the terminal 600 may simultaneously use the first wireless communications module 610 and the second wireless communications module 620 to establish connections of a wireless communications mode to a plurality of terminals. Optionally, the terminal 600 may separately establish wireless communication connections to the plurality of terminals, or may connect to all the terminals to establish a communication group.

For specific details of the terminal 600, refer to the description related to the terminal A in FIG. 3 to FIG. 10 in the foregoing embodiments. Details are not described herein again.

Specifically, the terminal 600 (a first terminal) corresponds to the terminal B in FIG. 3 to FIG. 5 and FIG. 10, and may specifically include the first wireless communications module 610, the second wireless communications module 620, and the processing module 630.

The processing module 630 may be configured to obtain a supported second wireless communications mode and a status and/or supported protocol information of the second wireless communications mode.

The first wireless communications module 610 may be configured to send a first broadcast message of a first wireless communications mode, where the first broadcast message carries the second wireless communications mode and the status and/or the supported protocol information of the second wireless communications mode, and the first broadcast message is used by a second terminal to determine whether to connect to the terminal 600.

The second wireless communications module 620 may be configured to establish a connection of the second wireless communications mode to the second terminal.

Optionally, the first wireless communications module 610 may be configured to: before sending the first broadcast message of the first wireless communications mode, receive a first wireless communications broadcast message of the second terminal, where the first wireless communications broadcast message is used to instruct the first terminal to send, after receiving the broadcast message, a broadcast message of the first wireless communications mode to the second terminal.

Optionally, the terminal 600 may further include a plurality of wireless communications modules such as a third wireless communications module and a fourth wireless communications module.

Optionally, the terminal 600 may simultaneously use the first wireless communications module 610 and the second wireless communications module 620 to establish a connection of a wireless communications mode and cooperatively complete a same service.

Optionally, the terminal 600 may simultaneously use the first wireless communications module 610 and the second wireless communications module 620 to establish connections of a wireless communications mode to a plurality of terminals.

Optionally, the terminal 600 may separately establish wireless communication connections to the plurality of terminals, or may connect to all the terminals to establish a communication group.

The terminal shown in FIG. 2 in the embodiments of the present invention may be configured to perform the methods described in FIG. 3 to FIG. 10. The memory 220 may store an instruction and data, and the at least one processor 210 of the terminal A and the terminal B may invoke different instructions and data in the memory 220 to respectively perform the method corresponding to the terminal A or the terminal B in FIG. 3 to FIG. 10. Details are not described herein in the embodiments of the present invention.

It can be understood that the at least one processor 210 sends/receives messages of a first terminal such as a broadcast message and a connection request by using a corresponding wireless communications module. Details are not further described herein. This representation method is applicable to all embodiments of the present invention.

A person of ordinary skill in the art may understand that all or some of the steps of the foregoing methods in the embodiments of the present invention may be implemented by a program instructing relevant hardware. The program may be stored in a computer readable storage medium. The computer readable storage medium includes: a ROM, a RAM, and an optical disc.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication establishment method, comprising: receiving, by a first terminal, a first broadcast message of a first wireless communications mode sent by a second terminal, wherein the first broadcast message carries a first parameter and a second parameter, the first parameter indicates a second wireless communications mode supported by the second terminal, the second parameter indicates whether the second wireless communications mode is currently available, wherein the first parameter and the second parameter are included in at least one of a version and feature field of the first broadcast message or an optional field of the first broadcast message, and the first broadcast message further indicates supported protocols of a plurality of protocol layers for the second wireless communications mode, and wherein the plurality of protocol layers comprises a transport layer, and the first broadcast message indicates whether the second terminal supports one or more of a TCP(Transmission Control Protocol), a UDP(User Datagram Protocol), or a CoAP(Constrained Application Protocol) of the transport layer; and determining, by the first terminal based on the second wireless communications mode supported by the second terminal and based on whether the second wireless communications mode is currently available and based on whether the transport layer protocol supported by the second terminal indicated by the first broadcast message matches transport layer protocol supported by the first terminal, whether to connect to the second terminal.

2. The method according to claim 1, wherein the determining, by the first terminal based on the second wireless communications mode supported by the second terminal and based on whether the second wireless communications mode is currently available, whether to connect to the second terminal comprises:
   displaying, by the first terminal, an identifier of the second terminal based on the second wireless communications mode supported by the second terminal and based on whether the second wireless communications mode is currently available; and
   determining, based on selection of a user, whether to connect to the second terminal.

3. The method according to claim 1, wherein before the determining, by the first terminal based on the second wireless communications mode supported by the second terminal and based on whether the second wireless communications mode is currently available, whether to connect to the second terminal, the method further comprises:
   receiving, by the first terminal, a second broadcast message of a third terminal, wherein the second broadcast message carries the second wireless communications mode supported by the third terminal and the second broadcast message carries a status or supported protocol information of the second wireless communications mode.

4. The method according to claim 3, wherein after the receiving, by the first terminal, a second broadcast message of a third terminal, the method further comprises:
   displaying an identifier of the third terminal; and
   determining, based on selection of a user, whether to connect to the third terminal.

5. The method according to claim 3, wherein after the receiving, by the first terminal, a second broadcast message of a third terminal, the method further comprises:
   displaying an identifier of the third terminal; and
   determining, based on selection of a user, whether to establish a communication group with the second terminal and the third terminal.

6. The method according to claim 1, wherein before the receiving, by the first terminal, a first broadcast message of a first wireless communications mode sent by the second terminal, the method further comprises:
   sending, by the first terminal, a broadcast message of the first wireless communications mode.

7. The method according to claim 1, wherein the first terminal simultaneously establishes a connection of the first wireless communications mode and a connection of the second wireless communications mode to the second terminal.

8. A communication establishment method, comprising: obtaining, by a first terminal, a second wireless communications mode and a status or supported protocol information of the second wireless communications mode; and sending, by the first terminal, a first broadcast message of a first wireless communications mode, wherein the first broadcast message carries a first parameter and a second parameter, the first parameter indicates the second wireless communications mode, the second parameter indicates whether the second wireless communications mode is currently available, wherein the first parameter and the second parameter are included in at least one of a version and feature field of the first broadcast message or an optional field of the first broadcast message, the first broadcast message further indicates supported protocols of a plurality of protocol layers for the second wireless communications mode, and the first broadcast message is used by a second terminal to determine whether to connect to the first terminal, and wherein the plurality of protocol layers comprises a transport layer, and the first broadcast message indicates whether the second terminal supports one or more of a TCP(Transmission Control Protocol), a UDP(User Datagram Protocol), or a CoAP(Constrained Application Protocol) of the transport layer.

9. The method according to claim 8, wherein before the sending, by the first terminal, a first broadcast message of a first wireless communications mode, the method further comprises:
receiving, by the first terminal, a first wireless communications broadcast message of the second terminal, wherein the first wireless communications broadcast message instructs the first terminal to send, after receiving the first wireless communications broadcast message, a broadcast message of the first wireless communications mode to the second terminal.

10. The method according to claim 8, wherein a first wireless communications broadcast message of the second terminal that is received by the first terminal carries a third wireless communications mode supported by the second terminal and the first wireless communications broadcast message indicates a status or supported protocol information of the third wireless communications mode.

11. A terminal, comprising: a wireless communications interface, configured to receive a first broadcast message of a first wireless communications mode sent by a second terminal, wherein the first broadcast message carries a first parameter and a second parameter, the first parameter indicates a second wireless communications mode supported by the second terminal, the second parameter indicates whether the second wireless communications mode is currently available, wherein the first parameter and the second parameter are included in at least one of a version and feature field of the first broadcast message or an optional field of the first broadcast message, and the first broadcast message further indicates supported protocols of a plurality of protocol layers for the second wireless communications mode, and wherein the plurality of protocol layers comprises a transport layer, and the first broadcast message indicates whether the second terminal supports one or more of a TCP(Transmission Control Protocol), a UDP(User Datagram Protocol), or a CoAP(Constrained Application Protocol) of the transport layer; a non-transitory memory storage comprising instructions; and one or more hardware processors in communication with the non-transitory memory storage, wherein the one or more hardware processors execute the instructions to: determine, based on the second wireless communications mode supported by the second terminal and based on whether the transport layer protocol supported by the second terminal indicated by the first broadcast message matches transport layer protocol supported by the terminal, whether to connect to the second terminal.

12. The terminal according to claim 11, wherein the terminal further comprises a display; and
the one or more hardware processors execute the instructions to:
display an identifier of the second terminal on the display based on the second wireless communications mode supported by the second terminal and based on whether the second wireless communications mode is currently available; and
determine, based on selection of a user, whether to connect to the second terminal.

13. The terminal according to claim 11, wherein before the one or more hardware processors execute the instructions to determines, based on the second wireless communications mode supported by the second terminal and based on whether the second wireless communications mode is currently available, whether to connect to the second terminal, the wireless communications interface is further configured to:
receive a second broadcast message of a third terminal, wherein the second broadcast message carries the second wireless communications mode supported by the third terminal and the second broadcast message carries a status or supported protocol information of the second wireless communications mode.

14. The terminal according to claim 13, wherein the terminal further comprises a display, and after the terminal receives the second broadcast message of the third terminal, the display is further configured to display an identifier of the third terminal; and
the one or more hardware processors execute the instructions to determine, based on selection of a user, whether to connect to the third terminal.

15. The terminal according to claim 13, wherein the terminal further comprises a display, and after the terminal receives the second broadcast message of the third terminal, the display is further configured to display an identifier of the third terminal; and
the one or more hardware processors execute the instructions to determine, based on selection of a user, whether to perform a communication group with the second terminal and the third terminal.

16. The terminal according to claim 11, wherein before the terminal receives the first broadcast message of the first wireless communications mode sent by the second terminal, the wireless communications interface is further configured to send a broadcast message of the first wireless communications mode.

\* \* \* \* \*